(12) United States Patent
Waibel et al.

(10) Patent No.: US 8,504,351 B2
(45) Date of Patent: *Aug. 6, 2013

(54) SIMULTANEOUS TRANSLATION OF OPEN DOMAIN LECTURES AND SPEECHES

(75) Inventors: Alexander Waibel, Pittsburgh, PA (US); Christian Fuegen, Mannheim (DE)

(73) Assignee: Mobile Technologies, LLC, Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/310,258

(22) Filed: Dec. 2, 2011

(65) Prior Publication Data

US 2012/0078608 A1 Mar. 29, 2012

Related U.S. Application Data

(63) Continuation of application No. 11/925,048, filed on Oct. 26, 2007, now Pat. No. 8,090,570.

(60) Provisional application No. 60/854,586, filed on Oct. 26, 2006.

(51) Int. Cl.
*G06F 17/28* (2006.01)
*G06F 17/20* (2006.01)

(52) U.S. Cl.
USPC .................... 704/2; 704/3; 704/5; 704/8

(58) Field of Classification Search
USPC ................... 704/1, 9, 235, 258, 270
See application file for complete search history.

(56) References Cited

U.S. PATENT DOCUMENTS

| | | | |
|---|---|---|---|
| 6,085,162 A | 7/2000 | Cherny | |
| 6,104,989 A | 8/2000 | Kanevsky et al. | |
| 6,148,105 A | 11/2000 | Wakisaka et al. | |
| 6,219,646 B1 | 4/2001 | Cherny | |
| 6,266,642 B1 * | 7/2001 | Franz et al. | 704/277 |
| 6,292,769 B1 | 9/2001 | Flanagan et al. | |
| 6,339,754 B1 | 1/2002 | Flanagan et al. | |
| 6,996,520 B2 | 2/2006 | Levin | |
| 7,069,222 B1 | 6/2006 | Borquez et al. | |
| 7,539,619 B1 | 5/2009 | Seligman et al. | |
| 7,552,053 B2 | 6/2009 | Gao et al. | |
| 7,593,842 B2 | 9/2009 | Rousseau | |
| 7,668,718 B2 | 2/2010 | Kahn et al. | |
| 7,752,031 B2 | 7/2010 | Childress et al. | |
| 7,970,598 B1 * | 6/2011 | Flanagan et al. | 704/2 |
| 8,185,374 B2 * | 5/2012 | Kong et al. | 704/3 |

(Continued)

OTHER PUBLICATIONS

Leggetter et al, "Maximum likelihood linear regression for speaker adaptation of continuous density hidden Markov models", 1995, In Comput. Speech Lang., vol. 9, pp. 171-185.*

(Continued)

*Primary Examiner* — Richemond Dorvil
*Assistant Examiner* — Olujimi Adesanya
(74) *Attorney, Agent, or Firm* — K&L Gates LLP

(57) ABSTRACT

A real-time open domain speech translation system for simultaneous translation of a spoken presentation that is a spoken monologue comprising one of a lecture, a speech, a presentation, a colloquium, and a seminar. The system includes an automatic speech recognition unit configured for accepting sound comprising the spoken presentation in a first language and for continuously creating word hypotheses, and a machine translation unit that receives the hypotheses, wherein the machine translation unit outputs a translation, into a second language, from the spoken presentation.

20 Claims, 3 Drawing Sheets

U.S. PATENT DOCUMENTS

| | | | |
|---|---|---|---|
| 8,239,184 B2* | 8/2012 | Nash et al. | 704/2 |
| 2002/0169592 A1* | 11/2002 | Aityan | 704/2 |
| 2003/0115059 A1 | 6/2003 | Jayaratne | |
| 2005/0228641 A1 | 10/2005 | Chelba et al. | |
| 2007/0043567 A1* | 2/2007 | Gao et al. | 704/257 |
| 2007/0124131 A1* | 5/2007 | Chino et al. | 704/3 |
| 2007/0136068 A1* | 6/2007 | Horvitz | 704/270 |
| 2007/0150257 A1 | 6/2007 | Cancedda et al. | |

OTHER PUBLICATIONS

Okumura et al, "An Automatic Speech Translation System for Travel Conversation", 2002, In Proc. ARPA Human Language Technology Workshop, pp. 411-412.*

Fugen et al., "Advances in Lecture Recognition: The ISL RT-06S Evaluation System", INTERSPEECH 2006, 4 pages.

Fugen et al., "LingWear: A Mobile Tourist Information System", Proc. of Human Language Technology Conference, San Diego, CA 2001, 5 pages.

Fugen et al., "Open Domain Speech Translation: From Seminars and Speeches to Lectures", Jun. 19-21, 2006, Barcelona Spain, TC-Star Workshop on Speech-to-Speech Translation, pp. 81-86.

Gales, Maximum Likelihood Multiple Projection Schemes for Hidden Markov Models, 2000 (abstract), 2 pages.

Gales, "Semi-Tied Covariance Matrices for Hidden Markov Models", ICASSP 1998 (abstract), 1 page.

Gollan et al., "Cross Domain Automatic Transcription on the TC-STAR EPPS Corpus", ICASSP 2005, 4 pages.

Hurst, "Indexing, Searching, and Skimming of Multimedia Documents Containing Recorded Lectures and Live Presentations", 2003, In Proc. of ACM Multimedia, pp. 1-2.

Janin et al., "The ICSI Meeting Projectr: Resources and Research", Proc. of the ICASSP Meeting Recognition Workshop, Montreal, Canada 2004, 7 pages.

Kashioka, "Translation unit concerning timing of simultaneous translation" LREC-2002: Third International Conference on Language Resources and Evaluation. Proceedings, Las Palmas de Gran Canaria, Spain, May 27-Jun. 2, 2002; pp. 142-146.

Koehm, "Europarl: A Multilingual Corpus for Evaluation of Machine Translation", Info. Sci. Inst. U. of S. CA, 2002, 18 pages.

Köhler et al., "Rapid porting of ASR-systems to mobile devices," in Proc. of the 9th European Conference on Speech Communication and Technology, Sep. 2005, pp. 233-236.

Lamel et al., "The Translanguage English Database (TED)", ICSLP vol. LDC2002S04, 1994 (abstract), 1 page.

Leggetter et al., "Maximum Likelihood Linear Regression for Speaker Adaptation of Continuous Density Hidden Markov Models", Computer Speech & Lang., vol. 9(2) 1995 (abstract), 1 page.

Linguistic Data Consortium, Nov. 5, 2007, 2 pages at www.ldc.upenn.edu.

Mangu et al, "Finding Consensus Among Words: Lattice-Based Word Error Minimization", EUROSPEECH, 1999, 4 pages.

Matusov et al, "Evaluating Machine Translation Output with Automatic Sentence Segmentation," in Proc. of IWSLT 2005, pp. 148-154, Oct. 2005.

Nanjo et al., "Language Model and Speaking Rate Adaptation for Spontaneous Presentation Speech Recognition", Jul. 2004, IEEE Transactions of Speech and Audio processing, vol. 12, No. 4, pp. 391-400.

Olszewski et al., "Highly Directional Multi-Beam Audio Loudspeaker", INTERSPEECH 2006 (abstract), 1 page.

Papineni et al., "Bleu: A Method for Automatic Evaluation of Machine Translation", IBM Research Report, RC22176 (W0109-022), Sep. 17, 2001, 10 pages.

Paulik et al, "Document driven machine translation enhanced ASR", European Conference on Speech Communication and Technology, Interspeech, Sep. 2005, pp. 1-4.

Soltau et al., "A One-Pass Decoder Based on Polymorphic Linguistic Context Assignment", Automatic Speech Recognition and Understanding 2001 (abstract), 1 page.

Stolcke, "SRILM—An Extensible Language Modeling Toolkit", Speech Technology and Research laboratory, SRI international, Menlo Park, CA, 2002, 4 pages.

Stuker et al., "The ISL TC-STAR Spring 2006 ASR Evaluation Systems", TC-STAR Speech-to-Speech Translation Workshop, Spain 2006, 6 pages.

TC-STAR, "Scientific Publications (presented per year)", 2007, 19 pages at http://www.tc-star.org/pages/publication.htm.

Vogel et al., "The ISL statistical translation system for spoken language translation," In Proc. of the International Work-on Spoken Language Translation, Kyoto, Japan, 2004, pp. 65-72.

Waibel et at "Computers in the Human Interaction Loop", 5th International Workshop on Image Analysis for Multimedia Interactive Services, Lisbon 2004, 4 pages.

Web Data for Language Modeling, Nov. 5, 2007, 3 pages at www.ssli.ee.washington.edu/projects/ears/WebData/web_data_collection.html.

* cited by examiner

SIMULTANEOUS TRANSLATION OF OPEN DOMAIN LECTURES AND SPEECHES

CROSS REFERENCE TO RELATED APPLICATION

The present application claims priority as a continuation application to U.S. application Ser. No. 11/925,048, entitled "SIMULTANEOUS TRANSLATION OF OPEN DOMAIN LECTURES AND SPEECHES, filed Oct. 26, 2007, which claims priority to U.S. Provisional Patent Application No. 60/854,586, filed Oct. 26, 2006.

BACKGROUND

Growing international information structures and decreasing travel costs could make the dissemination of knowledge in this globalized world easier if language barriers could be overcome. Lectures are a very effective method of knowledge dissemination. Such personalized talks are the preferred method because they allow the speakers to tailor their presentation toward a specific audience, and in return allow the listeners to get the most relevant information through interaction with the speaker. In addition, personal communication fosters the exchange of ideas, allows for collaboration, and forms ties between distant units, e.g. scientific laboratories or companies. At the same time it is desirable to allow the presenters of talks and lectures to speak in their native language because, no matter how proficient in a foreign language, one will always feel more confident speaking in their native tongue. To overcome this obstacle human translators are currently the only solution. Unfortunately, translation services are often prohibitively expensive such that many lectures are not given at all as a result of language barriers. Thus, there is a need for systems and methods that use machine translation techniques to provide translation services at no or low cost to a wide audience, making it possible to overcome language barriers and bring people closer together.

SUMMARY

In various embodiments, the present invention is directed to a real-time open domain speech translation system for simultaneous translation of a spoken presentation that is a spoken monologue comprising one of a lecture, a speech, a presentation, a colloquium, and a seminar. The system includes an automatic speech recognition unit configured for accepting sound comprising the spoken presentation in a first language and for continuously creating word hypotheses, and a machine translation unit that receives the hypotheses, wherein the machine translation unit outputs a translation, into a second language, from the spoken presentation.

In various embodiments, the present invention is directed to a method of real-time simultaneous translation of an open domain spoken presentation that is a spoken monologue comprising at least one of a lecture, a speech, a presentation, a colloquium, and a seminar. The method includes recognizing speech of the spoken presentation, and translating the recognized speech into a second language.

In various embodiments, the present invention is directed to an apparatus for real-time simultaneous translation of an open domain spoken presentation that is a spoken monologue comprising at least one of a lecture, a speech, a presentation, a colloquium, and a seminar. The apparatus includes means for recognizing speech of the spoken presentation, and means for translating the recognized speech into a second language.

In various embodiments, the present invention is directed to a computer readable medium having stored thereon instructions which, when executed by a processor, cause the processor to translate an open domain spoken presentation that is a spoken monologue comprising at least one of a lecture, a speech, a presentation, a colloquium, and a seminar, wherein the processor:
recognizes speech of the spoken presentation; and
translates the recognized speech into a second language.

Those and other details, objects, and advantages of the present invention will become better understood or apparent from the following description and drawings showing embodiments thereof.

BRIEF DESCRIPTION OF THE DRAWINGS

The accompanying drawings illustrate examples of embodiments of the invention. In such drawings.

DESCRIPTION

Figure 1:
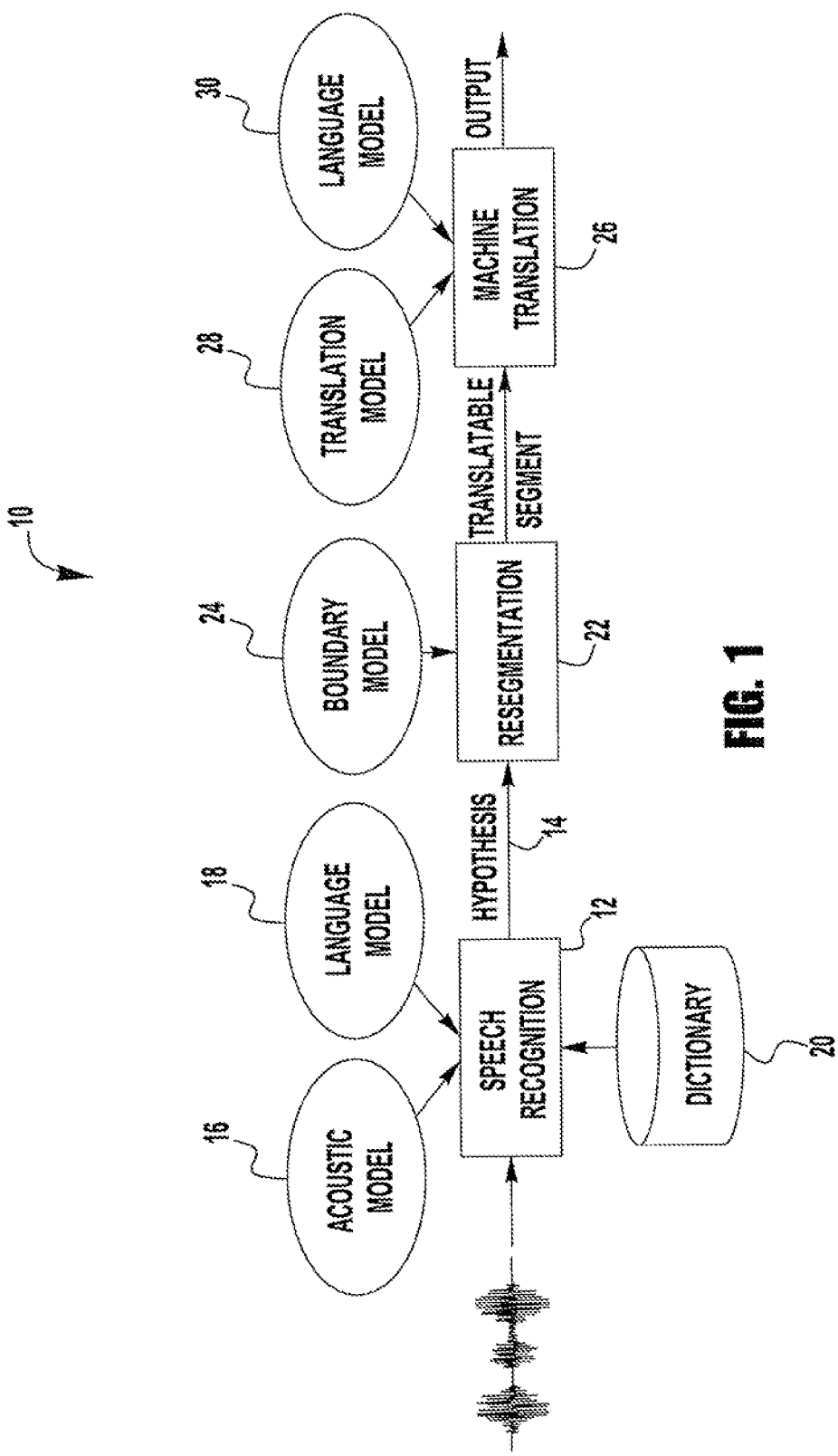
FIG. 1 illustrates a schematic overview of an embodiment of a simultaneous translation system 10 and its models.

Various embodiments of the present invention describe methods and apparatuses for open domain speech translation. Embodiments may be used to simultaneously translate, in real time, unlimited or open domain lectures and other spoken presentations or monologues such as, for example, parliamentary sessions using automatic speech recognition (ASR) techniques. Embodiments may be used to translate such presentations from one language into one or more target languages such as, for example, translating lectures on a new domain from English to Spanish and German. In various embodiments, small amounts of lecture data were used to improve system performance by using language model adaptation with similar web data.

Lectures, seminars and presentations of any kind present problems for domain-unlimited speech translation because of the spontaneity of free speech, disfluencies, and ill-formed spontaneous natural discourse, the specialized vocabularies, topics, acronyms, named entities and expressions in typical lectures and presentations (by definition specialized content), the real-time & low-latency requirements, online adaptation to achieve simultaneous translation, and selection of translatable chunks or segments.

To address these problems in ASR and MT engines, embodiments of the present invention speed up recognition by adapting acoustic and language models to individual speakers. Also, in various embodiments the size of the acoustic model is restricted and the search space is more rigorously pruned. Further, in various embodiments, to adapt to a particular speaking style and domain, the language model is tuned offline on slides and publications by the speaker, either by reweighting available text corpora or by retrieving pertinent material on the Internet, similar publications or previous publications lectures by the same speaker.

Speech translation systems generally consist of two major components: speech recognition and machine translation. Available audio recordings are recognized and the resulting hypothesis transmitted to the machine translation, which outputs the translation. Performing speech recognition on a stream of audio data is generally done on a per utterance level, whereas the utterance boundaries have to be determined with the help of an audio segmenter in front of the speech recognizer. When the audio data contains noise artefacts or crosstalk, this strategy can be useful because such phenomenon can be removed in advance, leading to an increase in ASR performance.

The techniques used in such audio segmenters often require a global optimization over the whole audio data and therefore may be infeasible for a simultaneous translation system. On the other hand, speech/non-speech based audio segmenters introduce an additional latency, because the classification of speech/non-speech frames has to be followed by a smoothing process to remove mis-classifications. Also, in the architecture of the speech recognizer itself, longer utterances often lead to a disproportional increase of the search space during decoding and therefore to longer decoding times.

Most machine translation systems were developed in the context of text translation and have to cope with all the differences between a source and target language such as different amount and usage of word ordering, morphology, composita, idioms, and writing style, but also vocabulary coverage. In addition to the differences between a source and target language, spoken language, i.e. speech, differs also in style. While text is mostly grammatically correct, spoken language and especially spontaneous or sloppy speech contains many ungrammaticallities such as hesitations, interruptions and repetitions. In addition, the choice of words and the amount of vocabulary used differ between text and speech. Another difference is that text is written and semantic boundaries are marked with punctuation while for speech, either humans or automatic speech recognition systems have to be used to transcribe the data. This introduces an additional source of error and, due to the ungrammaticallities of speech, semantic boundaries are difficult to identify. This is a problem because traditionally almost all machine translation systems are trained on bilingual sentences, so that the input should be also sentence-like segments, which may be a problem when a low latency speech translation system is required. To cope with this problem, a third component focusing on the resegmentation of the ASR hypothesis with the requirement of achieving a high translation quality together with a low latency is described herein according to various embodiments.

FIG. 1 illustrates a schematic overview of an embodiment of a simultaneous translation system 10 and its models. A speech recognition unit 12 produces partial hypotheses 14 based on an acoustic model 16, a language model 18 and a dictionary 20. The hypotheses 14 are merged, filtered and resegmented by a resegmentation unit 22 using a boundary model 24. The processed hypotheses are transferred to a machine translation unit 26 for translation into another language. Such translation units 26 are specified by using a translation model 28 and a language model 30 and/or dictionaries or grammars. In various embodiments, one of the systems 10 is used for each desired language.

Figure 2:
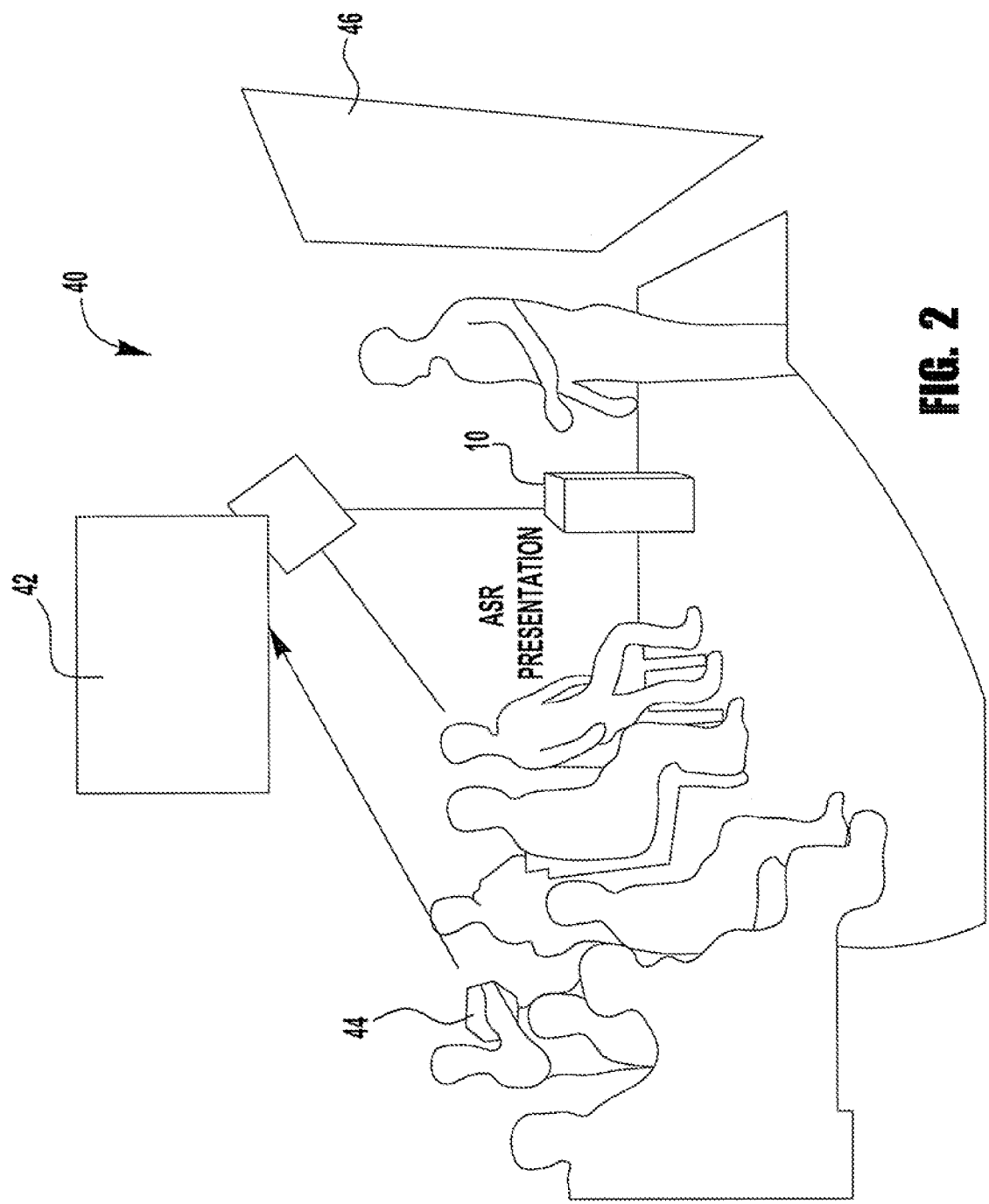
FIG. 2 illustrates an embodiment of a translation system having various output devices.

FIG. 2 illustrates an embodiment of a translation system 40 having various output devices. The system includes a targeted audio device 42, a heads up display unit (glasses or goggles) 44 and a monitor 46 that displays subtitled translations. When an attendee at a spoken presentation wears the heads up display unit 44, text in the translated language is projected into the field of view of the attendee. In various embodiments, the targeted audio device 42 such as that described in D. Olszewski, F. Prasetyo, and K. Linhard, "Steerable Highly Directional Audio Beam Loudspeaker", in Proc. of the Interspeech, Lisboa, Portugal, September 2006. The targeted audio device is a beam-steered loud-speaker, consisting of several small ultrasound loud-speakers. The device outputs audio in a beam with a width of about 1-2 meters. People sitting within the beam are able to hear the synthesized translation output and people outside the beam do not. In various embodiments, several such targeted audio devices are assigned in various languages to accommodate each participant in the lecture room.

In various embodiments, the following output devices may be used: Display Screens Naturally, output can be delivered via traditional display technology: display on separate screens, or as subtitles; but all add distraction and inconvenience and it limits output to one language.

Personalized headphones or PDA screens: This allows for individual choice of output language (if several are provided), but it is inconvenient to wear.

Translation goggles: Heads-up display goggles that display translations as captions in a pair of personalized goggles. Such a personalized visual output mode exploits the parallelism between acoustic and visual channels. This is particularly useful if listeners have partial knowledge of a speaker's language and wish to add complementary language assistance.

Targeted Audio Speakers: A set of ultra-sound speakers with high directional characteristics that provide a narrow audio beam to individual listeners in a small area of the audience, where simultaneous translation is required. Since such speakers are only audible in a narrow area, they do not disturb other listeners, and several speakers can provide different languages to different listeners.

Database: The translated speech may be output to a storage medium such as a database so that a user can browse, search, index, view, etc. the content and its translation at a later time.

In various embodiments, the techniques described in CHIL (Waibel et al., 2004), "Computers in the Human Interaction Loop", are used for speaker localization and tracking, speech activity detection and distant-talking automatic speech recognition, without any constraint on the number or distribution of microphones in the room nor on the number of sound sources active at the same time.

Various embodiments employ the techniques described in TC-STAR (TC-Star, 2004), "Technologies and Corpora for Speech-to-Speech-Translation", for Speech-to-Speech Translation (SST) for offline applications and for general topics of discussion (not simultaneous lectures), which is a combination of Automatic Speech Recognition (ASR), Spoken Language Translation (SLT) and Text to Speech (TTS).

Various embodiments use loose coupling, passing the first-best hypothesis from the recognizer to the translation component. Translation results may be reported using the evaluation metrics described in K. Papineni, S. Roukos, T. Ward, and W.-J. Zhu, "Bleu: a Method for Automatic Evaluation of Machine Translation". Technical Report RC22176 (WO109-022), IBM Research Division, T. J. Watson Research Center, 2002 and NIST MT evaluation kit version 11a, hup://www.nist.gov/speech/tests/mt, 2004. In various embodiments, all machine translation (MT) scores are calculated using case-insensitive scoring and one reference translation per test set.

Various embodiments integrate the aforementioned speech recognition and machine translation systems together with a sentence segmentation component and a speech synthesis into a client-server framework (see C. Fügen, M. Westphal, M. Schneider, T. Schultz, and A. Waibel, "LingWear: A Mobile Tourist Information System", in Proc. of the Human Language Technology Conf. (HLT), San Diego, Calif., March, NIST, 2001).

Various embodiments use the Janus Recognition Toolkit (JRTk) featuring the Ibis decoder as described in H. Soltau, F. Metze, C. Fugen, and A. Waibel, "A One Pass-Decoder Based on Polymorphic Linguistic Context Assignment", in ASRU, Trento, Italy, 2001. In various embodiments, the SRI Language Modeling Toolkit (SRILM) described in A. Stolcke, SRILM, "An Extensible Language Modeling Toolkit", in ICSLP, Denver, Colo., USA, 2002, is used for language modeling.

In various embodiments, to reach real-time end-to-end performance, the single pass speech recognizer is tuned to run faster than real-time by further restricting the beam search. In various embodiments, such an arrangement results in an increase in WER to about 13% on the evaluation talks but improves speed and reduces latency for simultaneous translation.

In various embodiments, to keep the latency of the system as short as possible the speech recognizer starts to decode while the speaker is talking and continuously returns partial back traces with first best hypotheses. Because the machine translation awaits complete sentences as input, the partial hypotheses are merged together and resegmented to sentence-like segments. Thus, no speech segmentation is performed before processing by the speech recognizer but is done afterwards so that the segmentation boundaries may be tuned with respect to optimal machine translation performance. In various embodiments, segmentation is done at silence regions only, whereby additional thresholds are defined to produce segments with a length of about, for example, five to ten words. Thus, the latency of the system may be limited to, for example, a maximum of about five seconds.

As described herein, for automatic speech recognition (ASR) and statistical machine translation (SMT) experiments on lectures using various embodiments of the present invention, three different lectures were selected as development and evaluation data. These lectures were held in non-native English by the same speaker on different topics and were recorded with close talking microphones as in C. Fügen, M. Kolss, D. Bernreuther, M. Paulik, S. Stüker, S. Vogel, and A. Waibel, "Open Domain Speech Recognition & Translation: Lectures and Speeches", in ICASSP, Toulouse, France, 2006. Dev: This 24 min talk was held to give a broad overview of current research projects in a lab.

Schiel, A. Fourcin, J. Mariani, and H. Tillman, "The Translanguage English Database TED", in ICSLP, volume LDC2002S04, Yokohama, September 1994), CHIL seminars (see A. Waibel, H. Steusloff, and R. Stiefelhagen, "CHIL Computers in the Human Interaction Loop", in 5th International Workshop on Image Analysis for Multimedia Interactive Services, Lisbon, April 2004, http://chil.server.de), and European Parliament Plenary Sessions (EPPS) (see C. Gollan, M. Bisani, S. Kanthak, R. Schluter, and H. Ney, "Cross Domain Automatic Transcription on the TC-STAR EPPS Corpus", ICASSP 2005). Table 1 illustrates an overview of the total amount of speech in the different corpora.

TABLE 1

|  | ICSI | NIST | TED | CHIL | EPPS |
|---|---|---|---|---|---|
| Speakers | 463 | 77 | 52 | 67 | 1894 |
| Duration | 72 h | 13 h | 13 h | 10 h | 80 h |

For language model training, some additional text data was used on top of the language model training data of (see C. Fügen, M. Wölfel, J. W. McDonough, S. Ikbal, F. Kraft, K. Laskowski, M. Ostendorf, S. Stüker, and K. Kumatani, "Advances in Lecture Recognition: The ISL RT-06S Evaluation System", Interspeech 2006, Pittsburgh, Pa., USA, September 2006 and S. Süker, C. Fügen, R. Hsiao, S. Ikbal, F. Kraft Q. Jin, M. Paulik, M. Raab, Y.-C. Tam; and M. Wölfel, "The ISL TC-STAR Spring 2006 ASR Evaluation Systems", in TC-Star Speech to Speech Translation Workshop, Barcelona, Spain, June 2006). Altogether, the following corpora were available: talks, text documents from TC-STAR and CHIL, EPPS transcripts, EPPS final text editions, non AMI meeting data (ISL, ICSI, NIST), AMI meeting data, TED lectures, CHIL seminars, broadcast news data, UN (United Nations) text data released by ELDA, recent proceedings data (2002-2005), web data from UWash (related to ISL, ICSI, and NIST meetings) and web data collected for RT-06S (related to CHIL seminars). Table 2 illustrates the amount of words available for each corpus. Empty cells indicate that the data was not useful for that domain.

TABLE 2

| Words | Talks 93k | docs 192k | eppsS 750k | eppsT 33M | nAMI 1.1M | AMI 200k | TED 98k | CHIL 45k | BN 131M | UN 42M | Proc 23M | Uwash 147M | wCHIL 146M |
|---|---|---|---|---|---|---|---|---|---|---|---|---|---|
| EPPS |  |  | 35% | 54% |  |  |  |  | 9% | 2% |  |  |  |
| CHIL |  |  |  |  | 15% | 8% | 0.6% | 25% | 0.8% |  | 24% | 12% | 15% |
| Dev | 36% | 1% |  | 12% |  |  | 3% |  | 8% |  | 9% | 11% | 19% | t035: A 35 min talk held as a conference key-note, which is only partly covered by the Dev talk.

t036+: A 31 min talk on the same topic as t035, but held in a different environment and situation.

In various embodiments, for ASR the seminar part of the NIST RT-06S development data and the 2006 EPPS development data are used as additional data sources. For acoustic model training, the following corpora are used: ICSI and NIST meeting recordings (see A. Janin, J. Ang, S. Bhagat, R. Dhillon, J. Edwards, N. Morgan, B. Peskin, E. Shriberg, A. Stolcke, C. Wooters, and B. Wrede, "The ICSI Meeting Project: Resources and Research", in Proc. of the ICASSP Meeting Recognition Workshop, Montreal, Canada, May 2004, NIST and Linguistic Data Consortium (LDC), ICSI, ISL and NIST Meeting Speech Corpora at LDC http://www.ldc.upenn.edu catalog IDs LDC2004S02, LDC2004S05, LDC2004S09, 2004), TED lectures (see L. F. Lamel, F.

The acoustic models described hereinbelow were all trained in the same way, resulting in a size of 16,000 distributions over 4,000 models, with a maximum of 64 Gaussians per model. These models are all based on the same quintphone context decision tree and phoneme set that was used for the RT-06S evaluation system. Furthermore, the acoustic model training setup was taken from the RT-06S system: a first incremental growing of Gaussians; estimation of the global STC transform as in M. J. F. Gales, "Semi-tied covariance matrices" in ICASSP 1998 and a second incremental growing of Gaussians. To train the distributions for the semi-continuous system and to compensate for the occasionally worse fixed-state alignments, two iterations of Viterbi training were performed. For the SAT models, four additional iterations of SAT Viterbi training by using constrained MLLR in the feature space (FSA) as in M. J. F. Gales, "Maximum Likelihood Linear Transformations for HMM-based Speech Recognition" Technical report, Cambridge University. Cambridge, United Kingdom, 1997 were applied. An MFCC FFT front-end with a 42-dimensional feature space after linear discriminant analysis (LDA) and a global STC transform with utterance-based cepstral mean subtraction (CMS) were used.

In various embodiments, a single acoustic model is used for both domains, EPPS and CHIL seminars and the acoustic model is used on the lecture data. Different acoustic models trained on different subsets of the acoustic training material described hereinabove were compared.

A three pass decoding setup is used in various embodiments. The first pass uses incremental speaker-based vocal tract length normalization (VTLN) and constrained MLLR estimation and is decoded with semi-continuous models using tight search beams. The second pass uses the same semi-continuous acoustic models as pass one, but before decoding, MLLR (see C. J. Leggetter and P. C. Woodland, "Maximum Likelihood Linear Regression for Speaker Adaptation of Continuous Density Hidden Markov Models", Computer Speech and Language, 9:171185, 1995) adaptation together with an estimation of fixed VTLN and constrained MLLR parameters is performed. For this, the confidence weighted hypotheses of the previous pass are used. For the third pass, the FSA-SAT acoustic models are used together with the same adaptation scheme applied in pass two. After that, confusion network combination (CNC) (see L. Mangu, E. Brill, and A. Stolcke, "Finding Consensus among Words: Lattice-based Word Error Minimization", in EUROSPEECH, 1999) is performed using the lattices of the third pass only. The same decoding dictionaries and language models are used as for the EPPS and RT-06S evaluation systems.

In various embodiments, for the CHIL seminars the same language models and dictionaries as described in C. Fügen, M. Wölfel, J. W. McDonough, S. Ikbal, F. Kraft, K. Laskowski, M. Ostendorl, S. Stüker, and K. Kumatani, "Advances in Lecture Recognition: The ISL RT-06S Evaluation System", Interspeech 2006, Pittsburgh, Pa., USA, September 2006, are used. The 4-gram language model was trained on AMI and non-AMI meetings, TED, CHIL data, BN, proceedings and web data related to meetings and CHIL lectures. The interpolation weights, which were tuned on held-out CHIL data are shown in Table 2. In one embodiment, the language model has a perplexity of 130 on the RT-06S development data, while 16% 4-grams, 41% 3-grams, 39% 2-grams, and 4% 1-grams are used. The dictionary consists of around 59 k pronunciation variants over a vocabulary of 52 k. It has an OOV-Rate of 0.65 on the RT-06S development data.

As can be seen in Table 3, acoustic models trained on EPPS alone or additionally including TED are significant worse than the other two systems. The performance of the two other systems is nearly identical, which means that adding the EPPS data to the acoustic model training data used in RT-06 (ICSI+NIST+TED) does not hurt (but also does not improve the overall results).

TABLE 3

| CHIL | 1st | 2nd | 3rd | cnc |
|---|---|---|---|---|
| EPPS | 40.3 | .— | .— | .— |
| TED + EPPS | 38.7 | .— | .— | .— |
| ICSI + NIST + TED + EPPS | 34.1 | 27.5 | 26.2 | 25.5 |
| ICSI + NIST + TED | 34.0 | 27.1 | 26.0 | 25.5 |

For the European Parliament Plenary Sessions, the language models and dictionaries as described in Stuker et al. are used. In one embodiment, the 4-gram language model was trained on EPPS transcriptions and final text editions, BN, and UN and reached a perplexity of 93 on the 2006 EPPS development data, whereas 29% 4-grams, 36% 3-grams, 32% 2-grams, and 4% 1-grams were used. The interpolation weights were tuned on the 2005 EPPS development data and are shown in Table 2. The dictionary for EPPS consists of 45 k pronunciations over a vocabulary of 40 k and has an OOV-Rate of 0.43 on the 2006 EPPS development data.

As can be seen in Table 4 the last system trained without EPPS performs worst. Furthermore, compared to the acoustic model used for the 2006 EPPS evaluation (MS23, Stuker et al.), the acoustic model training setup developed for RT-06S is significantly better (MS23 vs. EPPS rows). An additional gain can be seen by adding TED, which is also a corpus containing European English. By adding the meeting data, the system improves not further, instead it is in between the EPPS and TED+EPPS systems. Nevertheless, after doing confusion network combination, it performs identical to the TED+EPPS system.

TABLE 4

| | 1st | 2nd | 3rd | cnc |
|---|---|---|---|---|
| MS23 | 22.6 | .— | .— | .— |
| EPPS | 20.8 | 15.4 | 14.7 | 14.5 |
| TED + EPPS | 20.1 | 14.8 | 14.3 | 14.1 |
| ICSI + NIST + TED + EPPS | 20.6 | 15.1 | 14.6 | 14.1 |
| ICSI + NIST + TED | 29.1 | .— | .— | .— |

Compared to the CHIL seminars, the EPPS results compare favorably because of the available amount of acoustic and language model in-domain training data for EPPS compared to CHIT., where only a very small amount of in-domain data is available. Furthermore, the language used in the European Parliament is more formal and therefore less spontaneous. This leads also to a better OOV-rate and language model perplexity with a higher n-gram coverage for larger n-grams.

Based on the perplexities and OOV-Rates on Dev shown in Table 5 the language model and dictionary built for the CHIL seminars was selected for the baseline experiments. This selection holds also for the evaluation talks. The EPPS language model and vocabulary may be, due to the large amount of in-domain data, too specific. The OOV-rates of the RT-06S (CHIL) vocabulary and for t036+ are low because the talk is not very specific.

TABLE 5

| | Dev | | t035 | | t036+ | |
|---|---|---|---|---|---|---|
| | PPL | OOV | PPL | OOV | PPL | OOV |
| CHIL | 173 | 0.22 | 117 | 0.27 | 186 | 0.09 |
| EPPS | 205 | 1.29 | 230 | 1.83 | 229 | 1.72 |

As can be seen in Table 6, the acoustic model trained on all data performs significantly better than the other models. Thus, this model is used in various embodiments. The baseline results on the lecture evaluation talks are shown in Table 7. With the training setup developed for RT-06S the results improved compared to the acoustic models developed in Fügen and Kolss et al. (MS11 column in Table 7). Furthermore, it can be seen that the system performs well on unseen domains (t035) and different environments (t036+).

TABLE 6

|  | 1st | 2nd | 3rd | cnc |
|---|---|---|---|---|
| EPPS | 23.9 | .— | .— | .— |
| TED + EPPS | 23.4 | .— | .— | .— |
| ICSI + NIST + TED + EPPS | 21.4 | 16.2 | 15.0 | 15.5 |
| ICSI + NIST + TED | 24.3 | .— | .— | .— |

TABLE 7

|  | 1st | 2nd | 3rd | cnc | MS11 |
|---|---|---|---|---|---|
| t035 | 17.3 | 12.6 | 12.1 | 12.2 | 12.7 |
| t036+ | 16.7 | 12.0 | 11.6 | 11.5 | 12.4 |

Lectures are often suitable domains for doing adaptation, because the lecturer and also the topic might be known in advance. Therefore, acoustic and language model adaptation results are given hereinbelow. As can be seen, this allows reduction of the decoding setup from three to only a single decoding pass without any loss in WER.

For acoustic model adaptation an additional amount of around 7 hours of speech for the same speaker was available. For adaptation, subsets of this data with different durations were used to compute VTLN and constrained MLLR (FSA) parameters and to perform model based MLLR adaptation. The results can be seen in Table 8. While the adaptation works well on the evaluation talks, the 7 hrs results are similar to those achieved after CNC with the baseline systems—the results on the Dev talk are worse. This is due to a large channel mismatch between the adaptation material and the Dev talk. To confirm this, the particular talk itself was adapted and reached for all talks reasonable results (see column sup in Table 8). It can also be seen that doubling the adaptation data results in a relative gain of around 0.5% in WER. For language model adaptation a first experiment was performed by tuning the interpolation weights and reselecting the different corpora with respect to the lecture domain. The interpolation weights, tuned on some held-out data and the selected corpora can be seen in Table 2. Thus, the perplexity on the Dev talk could only be reduced from 173 to 168. Nevertheless there are gains in WER on all lectures, which are reported in Table 9.

TABLE 8

|  | 0.5 hrs | 1.5 hrs | 3.5 hrs | 7 hrs | sup |
|---|---|---|---|---|---|
| Dev | 20.9 | 20.0 | 19.5 | 18.9 | 12.0 |
| t035 | 14.2 | 13.1 | 12.6 | 12.1 | 10.1 |
| t036+ | 13.3 | 12.3 | 11.5 | 10.7 | 9.3 |

TABLE 9

|  | unadapted | adapted | PPL |
|---|---|---|---|
| Dev | 18.9 | 16.1 | 168 |
| t035 | 12.1 | 10.5 | 165 |
| t036+ | 10.7 | 9.1 | 193 |

To find a translation for a source phrase in various embodiments the general word alignment is restricted. Words inside the source phrase align to words inside the target phrase, and words outside the source phrase align outside the target phrase.

The constrained alignment probability is calculated using the IBM1 word alignment model, but the summation of the target words is restricted to the appropriate regions in the target sentence. Also, the position alignment probabilities are adjusted accordingly using Vogel. Optimization is over the target side boundaries $i_1$ and $i_2$ $$p_{i_1,i_2}(f|e) = \prod_{j=1}^{j_1-1} \sum_{i \in (i_1,i_2)} \frac{1}{I-k} p(f_j|e_i) \times \prod_{j=j_1}^{j_2} \prod_{i=i_1}^{i_2} \frac{1}{k} p(f_j|e_i) \times \prod_{j=j_2+1}^{J} \sum_{i \in (i_1,i_2)} \frac{1}{I-k} p(f_j|e_i) \quad (1)$$

Similar to $p_{i_1,i_2}(f|e)$ then $p_{i_1,i_2}(e|f)$ can be calculated, now summing over the source words and multiplying along the target words. To find the optimal target phrase the log probabilities are interpolated and the pair $(i_1,i_2)$ that gives the highest probability is used. The interpolation factor c can be estimated on a development test set. The scores calculated in the phrase alignment are alignment scores for the entire sentence. As phrase translation probabilities the second term in Equation 1 is used.

The beam search decoder combines all model scores to find the best translation. In such embodiments, the different models used were: (1) the translation model, i.e. the word-to-word and phrase-to-phrase translations extracted from the bilingual corpus according to the new alignment method described herein; (2) a trigram language model—the SRI language model toolkit was used to train the models. (3) A word reordering model, which assigns higher costs to longer distance reordering. The jump probabilities p(j|j') of the HMM word alignment model where j is the current position in the source sentence and j is the previous position was used. (4) Simple word and phrase count models. The former is essentially used to compensate for the tendency of the language model to prefer shorter translations, while the latter can be used to give preference to longer phrases. For each model a scaling factor can be used to modify the contribution of this model to the overall score.

The decoding process is organized into two stages: First, the word-to-word and phrase-to-phrase translations and, if available, other specific information such as named entity translation tables are inserted into a translation lattice. In the second step, the best combinations of the partial translations are found, such that every word in the source sentence is covered exactly once. This amounts to doing a best path search through the translation lattice, which is extended to allow for word reordering: Decoding proceeds essentially along the source sentence. At each step, however, the next word or phrase to be translated may be selected from all words laying or phrases starting within a given look-ahead window from the current position.

For training the baseline translation systems, the parallel EPPS corpus was used. For English-Spanish, a version was created by RWTH Aachen within TC-STAR (see Gollan et al.). The English-to-German models were trained on the EPPS data as provided in P. Koehn, "Europarl: A Multilingual Corpus for Evaluation of Machine Translation", http://people.csail.mit.edu/koehn/publications/europarl, 2003. In addition, a small number of lectures similar in style to development and evaluation data was collected, transcribed, and translated into Spanish and German. Altogether, parallel lecture corpora of about 12,000 words were available in each language.

Adapting the MT component of the EPPS translation system towards the more conversational style of lectures was accomplished by a higher weighting of the available lecture data in two different ways. First, for computing the translation models, the small lecture corpora were multiplied several times and added to the original EPPS training data.

Second, for (target) language model computation, a small tri-gram LM was computed on t035 and then interpolated with the original EPPS language model, whereas the interpolation weight was chosen in order to minimize the perplexity on the development set. In this manner the perplexity on the Dev talk could be reduced from 645 to 394 for German and from 543 to 403 for Spanish. To further adapt the target language models, Spanish and German web data was collected with the help of tools provided by the University of Washington (see University of Washington, web data collection scripts. http://ssli.ee.washington.edu/projects/ears/WebData/web data collection.html, 2006). A small amount of the used search queries were handwritten, however, most search queries were automatically created by using the most frequent tri-grams found in the Dev talk. Approximately ¼ of all development set tri-grams were used for this. The German and Spanish web corpora collected in this manner consisted out of 175M words and 120M words, respectively. The web corpora were again added to the existing LMs by interpolation, which yielded a perplexity of 200 for German and 134 for Spanish. The corresponding perplexities on the t036+ talks are 617 and 227, respectively. The effects of translation model and language model adaptation, as well as the results of the final system, combining both adaptation steps, are shown in Tables 10 and 11 for English-to-Spanish and English-to-German, respectively. An element of better performance is to take advantage of smaller amounts of lecture data and other text and presentation data in order to improve the language model adaptation.

TABLE 10

Results on manual transcripts are shown in brackets.

| System | NIST | Bleu |
| --- | --- | --- |
| baseline (EPPS) | 4.71 (5.61) | 15.41 (20.54) |
| TM-adaptation | 4.78 (5.67) | 16.05 (21.43) |
| LM-adaptation | 5.10 (5.99) | 17.58 (22.90) |
| final system | 5.22 (6.11) | 18.57 (24.00) |

TABLE 11

Results on manual transcripts are shown in brackets.

| System | NIST | Bleu |
| --- | --- | --- |
| baseline (EPPS) | 4.00 (4.71) | 09.32 (12.53) |
| TM-adaptation | 4.29 (5.06) | 11.01 (14.95) |
| LM-adaptation | 4.37 (5.12) | 11.67 (14.96) |
| final system | 4.67 (5.47) | 13.22 (17.25) |

Figure 3:
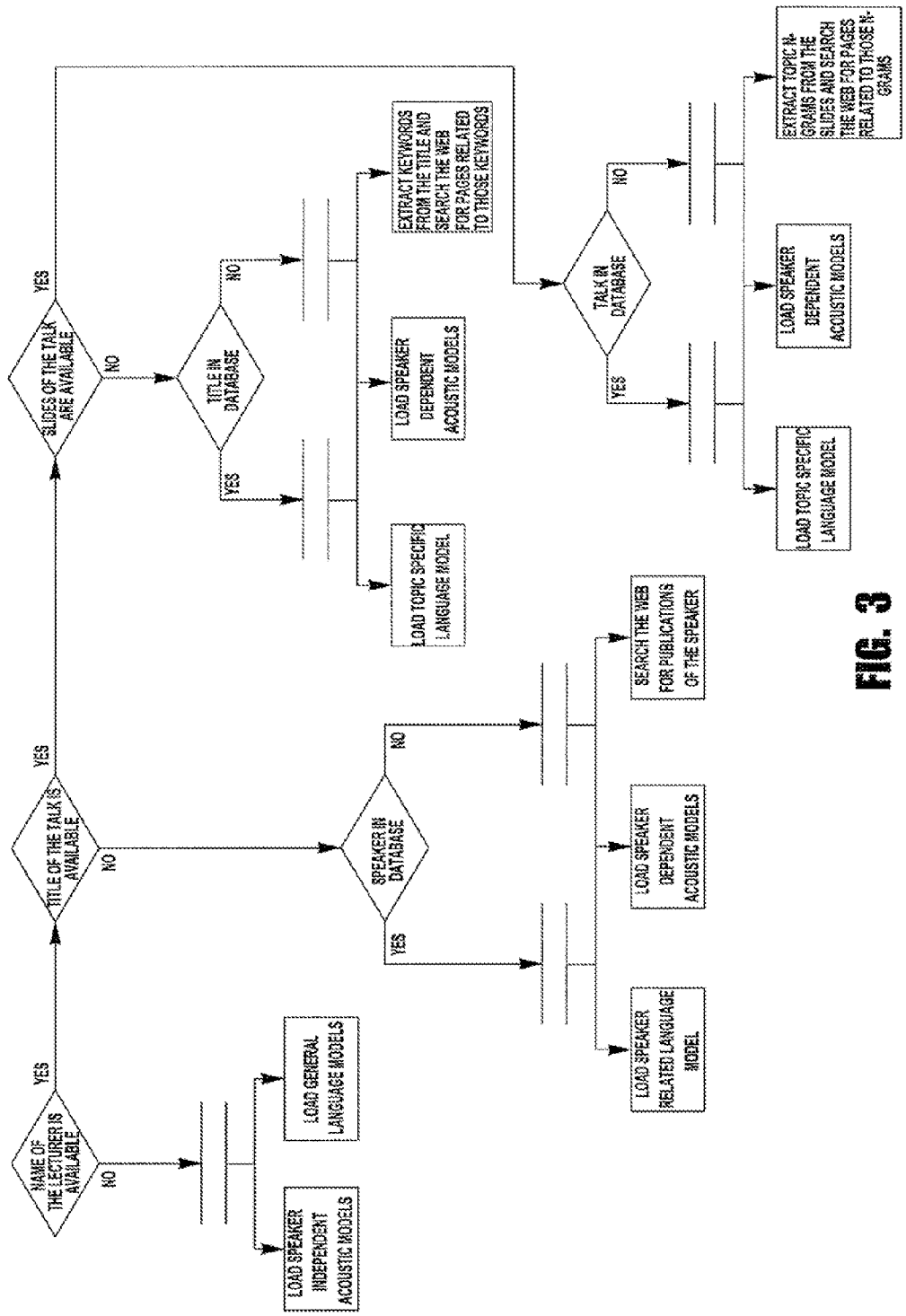
FIG. 3 illustrates an open domain process according to an embodiment of the present invention.

FIG. 3 illustrates an open domain process according to an embodiment of the present invention. As can be seen in FIG. 3 several actions may be performed by the lecture translation system in advance to a lecture. If neither the lecturer nor the title or topic of a lecture is known in advance as determined at startup time, the system loads general speaker independent acoustic, language, and translation models. Since no further information is given, the system is also not able to adapt its models any further. If only the name of the speaker is known and the speaker has already given a talk, on which the system has adapted its models and stored in the lecturer database, the system is now able to load speaker adapted acoustic models. Since the topic is unknown it has to load general or at most slightly adapted language and translation models. If there is no information about the speaker stored in the database, speaker independent models has to be loaded. In both cases the information about the speaker can be used to query the internet for previous lectures or other publications by the same speaker to adapt the language and translation models.

If also the title or even the slides of the talk are available in advance, this information can be used to search the Internet for even more specific material, which can be related to the speaker but also to the topic. Therefore, topic related keywords or n-grams are extracted from the title or slides. Thus, the more information about a speaker that is known in advance, the better the models can be adapted and the better the system will perform in the end. For performing the adaptation, the material collected from the Internet has first to be filtered and normalized in order to interpolate it with the other more general background models.

While the foregoing has been set forth in considerable detail, it is to be understood that the drawings and detailed embodiments are presented for elucidation and not limitation. Design variations may be made but are within the principles of the invention. Those skilled in the art will realize that such changes or modifications of the invention or combinations of elements, variations, equivalents, or improvements therein are still within the scope of the invention as defined in the appended claims. Also, the examples and experimental results illustrated herein are exemplary and are not intended to limit the scope of the embodiments of the invention.

What is claimed is:

1. A speech translation system comprising:
at least one processor programmed to implement:
an automatic speech recognition unit configured for accepting sound comprising a real-time open domain spoken presentation by a first speaker in a first language and for continuously creating a plurality of partial hypotheses of the open domain spoken presentation in real time while the first speaker is speaking, wherein the automatic speech recognition unit comprises;
a speaker-adapted acoustic model that is adapted prior to the real-time open domain spoken presentation based on at least one prior talk by the first speaker for which acoustic model parameters for speech recognition have been adapted; and
a language model;
a resegmentation unit in communication with the automatic speech recognition unit, wherein the resegmentation unit is configured to:
merge at least two partial hypotheses received from the automatic speech recognition unit; and
resegment the merged partial hypotheses into a translatable segment; and
a machine translation unit, in communication with the resegmentation unit, that receives the translatable segment from the resegmentation unit, wherein the machine translation unit outputs a translation of the open domain spoken presentation of the first source in a second language based on the translatable segment received from the segmentation unit.

2. The speech translation system of claim 1, wherein the language model comprises a speaker-related language model that is adapted prior to the real-time open domain spoken presentation based on at least one prior talk by the first speaker for which language model parameters for speech recognition have been adapted.

3. The speech translation system of claim 1, wherein the speaker-adapted acoustic model is further adapted prior to the real-time open domain spoken presentation based on a known subject matter of the open domain spoken presentation by the first speaker.

4. The speech translation system of claim 3, wherein the language model comprises a topic specific language model that is adapted prior to the real-time open domain spoken presentation based on the known subject matter of the open domain spoken presentation by the first speaker.

5. The speech translation system of claim 1, wherein:
the speaker-adapted acoustic model is further adapted prior to the real-time open domain spoken presentation based on a known subject matter of the real-time open domain spoken presentation by the first speaker; and
the language model comprises a topic-specific and speaker-related language model that is adapted prior to the real-time open domain spoken presentation based on:
at least one prior talk by the first speaker for which language model parameters for speech recognition have been adapted; and
the known subject matter of the real-time open domain spoken presentation by the first speaker.

6. The speech translation system of claim 5, wherein the known subject matter of the real-time open domain spoken presentation is determined based on one or more printed materials related to the real-time open domain spoken presentation.

7. The speech translation system of claim 6, wherein the one or more printed materials comprises one or more printed materials accompanying the real-time open domain spoken presentation.

8. The speech translation system of claim 1, wherein the merged partial hypotheses are resegemented into a translatable segment at a silence region of the real-time open domain spoken presentation.

9. The speech translation system of claim 1, wherein there is an upper limit of words for the translatable segment to keep the system latency low.

10. The speech translation system of claim 9, wherein the upper limit on the translatable segment is ten words.

11. A speech translation method comprising:
recognizing, by at least one processor implementing an automatic speech recognition unit, speech comprising a real-time open domain spoken presentation by a first speaker in a first language, wherein recognizing the speech comprises:
receiving sounds comprising the speech; and
continuously creating partial hypotheses of the open domain spoken presentation in real time while the speaker is speaking using:
a speaker-adapted acoustic model that is adapted prior to the real-time open domain spoken presentation based on at least one prior talk by the speaker for which acoustic model parameters for speech recognition have been adapted; and
a language model;
merging, by the at least one processor implementing a resegmentation unit that is in communication with the automatic speech recognition unit, at least two partial hypotheses received from the automatic speech recognition unit;
resegmenting, by the resegmentation unit, the merged partial hypotheses into a translatable segment; and
translating, by the at least one processor implementing a machine translation unit that is in communication with the automatic speech recognition unit, the speech of the first speaker into a second language based on the translatable segment from the resegmentation unit.

12. The method of claim 11, wherein the language model comprises a speaker-related language model that is adapted prior to the real-time open domain spoken presentation based on at least one prior talk by the first speaker for which language model parameters for speech recognition have been adapted.

13. The method of claim 11, wherein the speaker-adapted acoustic model is further adapted prior to the real-time open domain spoken presentation based on a known subject matter of the open domain spoken presentation by the first speaker.

14. The method of claim 13, wherein the language model comprises a topic specific language model that is adapted prior to the real-time open domain spoken presentation based on the known subject matter of the open domain spoken presentation by the first speaker.

15. The method of claim 11, wherein:
the speaker-adapted acoustic model is further adapted prior to the real-time open domain spoken presentation based on a known subject matter of the real-time open domain spoken presentation by the first speaker; and
the language model comprises a topic-specific and speaker-related language model that is adapted prior to the real-time open domain spoken presentation based on:
at least one prior talk by the first speaker for which language model parameters for speech recognition have been adapted; and
the known subject matter of the real-time open domain spoken presentation by the first speaker.

16. The method of claim 15, wherein the known subject matter of the real-time open domain spoken presentation is determined based on one or more printed materials related to the real-time open domain spoken presentation.

17. The method of claim 16, wherein the one or more printed materials comprises one or more printed materials accompanying the real-time open domain spoken presentation.

18. The method of claim 11, wherein the merged partial hypotheses are resegemented into a translatable segment at a silence region of the real-time open domain spoken presentation.

19. The method of claim 11, wherein there is an upper limit of words for the translatable segment to keep the system latency low.

20. The method of claim 19, wherein the upper limit on the translatable segment is ten words.

* * * * *